(12) United States Patent
Sakuratani

(10) Patent No.: US 8,599,532 B2
(45) Date of Patent: Dec. 3, 2013

(54) MONOLITHIC CERAMIC ELECTRONIC COMPONENT

(75) Inventor: Masahiro Sakuratani, Nagaokakyo (JP)

(73) Assignee: Murata Manufactuing Co., Ltd., Kyoto (JP)

( * ) Notice: Subject to any disclaimer, the term of this patent is extended or adjusted under 35 U.S.C. 154(b) by 0 days.

(21) Appl. No.: 13/517,624

(22) Filed: Jun. 14, 2012

(65) Prior Publication Data

US 2012/0319536 A1 Dec. 20, 2012

(30) Foreign Application Priority Data

Jun. 16, 2011 (JP) ................................ 2011-133884
Mar. 30, 2012 (JP) ................................ 2012-079712

(51) Int. Cl.
*H01G 4/228* (2006.01)

(52) U.S. Cl.
USPC .................. 361/306.3; 361/306.1; 361/321.1; 361/321.2; 361/303; 361/301.4

(58) Field of Classification Search
USPC ............... 361/306.3, 306.1, 303–305, 301.2, 361/301.4, 309.311–313, 321.1, 321.2
See application file for complete search history.

(56) References Cited

U.S. PATENT DOCUMENTS

| | | | | |
|---|---|---|---|---|
| 6,310,757 B1 * | 10/2001 | Tuzuki et al. | ............... | 361/308.1 |
| 6,407,907 B1 * | 6/2002 | Ahiko et al. | ............... | 361/306.3 |
| 6,426,551 B1 * | 7/2002 | Kawakami et al. | ........... | 257/700 |
| 6,542,352 B1 * | 4/2003 | Devoe et al. | ............... | 361/321.2 |
| 6,819,543 B2 * | 11/2004 | Vieweg et al. | ............. | 361/306.3 |
| 6,922,329 B2 * | 7/2005 | Togashi | ......................... | 361/309 |
| 6,960,366 B2 | 11/2005 | Ritter et al. | | |
| 6,972,942 B2 | 12/2005 | Ritter et al. | | |
| 6,982,863 B2 | 1/2006 | Galvagni et al. | | |
| 7,067,172 B2 | 6/2006 | Ritter et al. | | |
| 7,152,291 B2 | 12/2006 | Ritter et al. | | |
| 7,154,374 B2 | 12/2006 | Ritter et al. | | |

(Continued)

FOREIGN PATENT DOCUMENTS

| | | |
|---|---|---|
| JP | 2004-327983 A | 11/2004 |
| JP | 2007-042743 A | 2/2007 |
| JP | 2011-192968 A | 9/2011 |

OTHER PUBLICATIONS

Taniguchi et al., "Multilayer Ceramic Electronic Component and Manufacturing Method Thereof", U.S. Appl. No. 12/485,360, filed Jun. 16, 2009.

Yoshida et al., "Monolithic Ceramic Electronic Component", U.S. Appl. No. 12/494,537, filed Jun. 30, 2009.

(Continued)

*Primary Examiner* — Nguyen T Ha
(74) *Attorney, Agent, or Firm* — Keating & Bennett, LLP

(57) ABSTRACT

In a monolithic ceramic electronic component, where a distance in the height direction between one of outer-layer dummy conductors in an outer layer portion, which is arranged closest to an inner layer portion, and one of inner electrodes in the inner layer portion, which is arranged closest to the outer layer portion, is b, and an opposing distance between an adjacent pair of first inner electrodes and second inner electrodes in the height direction is t, $2t \leq b$ is satisfied, such that the outer-layer dummy conductors can be spaced a sufficient distance away from the inner electrodes, and such that the distance between the inner electrodes can be prevented from being reduced when the inner electrodes arranged in overlapping relation to the outer-layer dummy conductors are pressed in a pressing step before firing, and a reduction of BDV can be prevented.

4 Claims, 12 Drawing Sheets

(56) References Cited

U.S. PATENT DOCUMENTS

| | | | |
|---|---|---|---|
| 7,161,794 | B2 | 1/2007 | Galvagni et al. |
| 7,177,137 | B2 | 2/2007 | Ritter et al. |
| 7,344,981 | B2 | 3/2008 | Ritter et al. |
| 7,345,868 | B2 | 3/2008 | Trinh |
| 7,463,474 | B2 | 12/2008 | Ritter et al. |
| 7,808,770 | B2 * | 10/2010 | Itamura et al. ............... 361/309 |
| 8,259,433 | B2 * | 9/2012 | Nishisaka et al. ......... 361/306.3 |
| 2005/0046536 | A1 | 3/2005 | Ritter et al. |
| 2007/0014075 | A1 | 1/2007 | Ritter et al. |
| 2007/0025054 | A1 | 2/2007 | Tonogai et al. |
| 2008/0123248 | A1 | 5/2008 | Kunishi et al. |
| 2008/0123249 | A1 | 5/2008 | Kunishi et al. |
| 2008/0158774 | A1 | 7/2008 | Trinh |
| 2011/0205684 | A1 | 8/2011 | Yamamoto et al. |

OTHER PUBLICATIONS

Iwanaga et al., "Laminated Ceramic Electronic Component and Manufacturing Method Therefor", U.S. Appl. No. 13/189,636, filed Jul. 25, 2011.

Sasaki, "Electronic Component", U.S. Appl. No. 13/187,678, filed Jul. 21, 2011.

Akazawa et al., "Multilayer Ceramic Electronic Component", U.S. Appl. No. 13/357,677, filed Jan. 25, 2012.

Taniguchi et al., "Multilayer Ceramic Electronic Component and Manufacturing Method Thereof", U.S. Appl. No. 13/484,300, filed May 31, 2012.

Akazawa et al., "Laminated Ceramic Electronic Component", U.S. Appl. No. 13/494,042, filed Jun. 12, 2012.

Sakuratani et al., "Monolithic Ceramic Electronic Component", U.S. Appl. No. 13/517,625, filed Jun. 14, 2012.

* cited by examiner

MONOLITHIC CERAMIC ELECTRONIC COMPONENT

BACKGROUND OF THE INVENTION

1. Field of the Invention

The present invention relates to a monolithic ceramic electronic component, and more particularly, to a monolithic ceramic electronic component provided with outer electrodes including plated films that are directly disposed on outer surfaces of a ceramic base element.

2. Description of the Related Art

Recently, sizes of electronic devices, such as cellular phones, notebook personal computers, digital cameras, and digital audio devices, have become increasingly smaller. Monolithic ceramic electronic components capable of being manufactured to have smaller sizes and higher performance have been used in many of these electronic devices.

The monolithic ceramic electronic component usually includes a ceramic base element including a plurality of stacked ceramic layers, inner electrodes formed inside the ceramic base element, and outer electrodes formed on outer surfaces of the ceramic base element. Further, the monolithic ceramic electronic component is disposed on conductive lands of a mounting board and is mounted to the board by using a conductive bonding material, e.g., a solder.

There are still now continuing demands for further size reduction of monolithic ceramic electronic components.

However, when the size of the monolithic ceramic electronic component is reduced, an effective area in which the inner electrodes are opposed to each other is also reduced. Thus, characteristics of the monolithic ceramic electronic component tend to deteriorate.

Further, in a multi-terminal monolithic ceramic electronic component, a plurality of stripe-shaped outer electrodes is required to be arranged at a narrow pitch. However, a known method of baking a thick film paste is limited in terms of the accuracy of applying the paste and it is difficult to form the outer electrodes with high accuracy.

In view of these problems, a method of forming the outer electrodes directly by plating is proposed. With this method, thin and flat outer electrodes can be formed, and thus, the effective area of the inner electrodes can be increased. Moreover, because plated metals are deposited on the exposed portions of the inner electrodes, the outer electrodes can be formed with high accuracy even at a narrow pitch.

To achieve more reliable growth of the plated metals when the outer electrodes are formed directly by plating, Japanese Unexamined Patent Application Publication No. 2004-327983, for example, discloses the use of dummy conductors (anchor tabs). According to the technique disclosed in Japanese Unexamined Patent Application Publication No. 2004-327983, plated metals can be deposited on not only the exposed portions of the inner electrodes, but also on the exposed portions of the dummy conductors. Therefore, growth of the plated metals can be more reliably ensured.

However, with the method disclosed in Japanese Unexamined Patent Application Publication No. 2004-327983, reliability, e.g., breakdown voltage (BDV), of the monolithic ceramic electronic component may be degraded in some cases. The inventor of the invention described and claimed in the present application has conducted intensive studies to determine the cause of the degradation of reliability. As a result, the inventor discovered that the degradation of reliability (BDV) is attributable to the presence of the dummy conductors. In more detail, the inventor has discovered that, when the dummy conductors are provided in an outer layer portion in which there are no inner electrodes, the inner electrodes arranged in overlapping relation to the dummy conductors are excessively pressed in a pressing step before firing due to the presence of the dummy conductors, and the distance between the inner electrodes adjacent to each other is reduced.

SUMMARY OF THE INVENTION

In view of the above-described problems, a preferred embodiment of the present invention provides a monolithic ceramic electronic component including a ceramic base element including a plurality of stacked ceramic layers and, outer surfaces defined by first and second principal surfaces opposed to each other, first and second lateral surfaces opposed to each other, and first and second end surfaces opposed to each other, first inner electrodes disposed inside the ceramic base element and each including a first opposing portion and a first lead-out portion led out from the first opposing portion to the outer surface of the ceramic base element, second inner electrodes disposed inside the ceramic base element and each including a second opposing portion, which is opposed to the first opposing portion with the ceramic layer interposed therebetween, and a second lead-out portion led out from the second opposing portion to the outer surface of the ceramic base element, a first outer electrode disposed on the outer surface of the ceramic base element and including a plated film that directly covers an exposed portion of the first lead-out portion, and a second outer electrode disposed on the outer surface of the ceramic base element, electrically connected to the exposed portion of the second lead-out portion, and connected to a different potential from that of the first outer electrode.

Assuming that a direction interconnecting the first and second principal surfaces is defined as a height direction, a region in which the first inner electrodes and the second inner electrodes are provided in the height direction is defined as an inner layer portion, and a region in which the first inner electrodes and the second inner electrodes are both not provided in the height direction is defined as an outer layer portion, preferably, outer-layer dummy conductors are disposed in the outer layer portion such that the outer-layer dummy conductors are each led out to the outer surface of the ceramic base element in overlapping relation to the first lead-out portion when the ceramic base element is viewed in the height direction, the outer-layer dummy conductors including exposed portions directly covered with the plated film of the first outer electrode.

Preferably, assuming a distance in the height direction between one of the outer-layer dummy conductors in the outer layer portion disposed closest to the inner layer portion, and one of the first inner electrodes or the second inner electrodes in the inner layer portion arranged closest to the outer layer portion, is b, and an opposing distance between an adjacent two of the first inner electrodes and the second inner electrodes in the height direction is t, $2t \leq b$ is preferably satisfied.

Preferably, $b \leq$ about 6 μm, for example, is further satisfied.

In a monolithic ceramic electronic component according to another preferred embodiment of the present invention, assuming a direction interconnecting the first and second lateral surfaces is defined as a widthwise direction, and a direction interconnecting the first and second end surfaces is defined as a lengthwise direction, a length of each of the first and second lateral surfaces along the lengthwise direction is preferably greater than a length of each of the first and second end surfaces along the widthwise direction, the first opposing portion has a substantially rectangular shape having a longer side and a shorter side, and the first lead-out portion is led out from the longer side of the first opposing portion to at least one of the first and second lateral surfaces.

In another preferred embodiment, the first lead-out portion is more preferably led out so as to extend across a central portion of at least one of the first and second lateral surfaces in the lengthwise direction.

With a preferred embodiment of the present invention, since the outer-layer dummy conductor disposed in the outer layer portion closest to the inner layer portion can be located sufficiently far enough away from the first inner electrode or the second inner electrode, which is disposed in the inner layer portion closest to the outer layer portion, pressing of the inner electrodes through the outer-layer dummy conductors is reduced in a pressing step before firing, whereby the distance between the inner electrodes is prevented from being reduced. Thus, it is possible to prevent degradation of reliability of the monolithic ceramic electronic component, e.g., a reduction of BDV, which may be caused by the reduced distance between the inner electrodes.

In accordance with a preferred embodiment of the present invention, from the viewpoint of preventing the degradation of reliability, the above-described distance b between the outer-layer dummy conductor positioned in the outer layer portion closest to the inner layer portion and the first inner electrode or the second inner electrode positioned in the inner layer portion closest to the outer layer portion is preferably longer. However, as the distance b increases, growth of the plated film for the first outer electrode is likely to be impeded. Stated another way, there is an increased risk that it may be difficult to connect a plated film growing with the exposed portion of the outermost inner electrode being a nucleus and a plated film growing with the innermost outer-layer dummy conductor being a nucleus in the height direction. For that reason, the distance b is preferably set so as to satisfy b≤about 6 μm, for example. By satisfying that condition, the growth of the plated film for the first outer electrode can be more reliably ensured.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
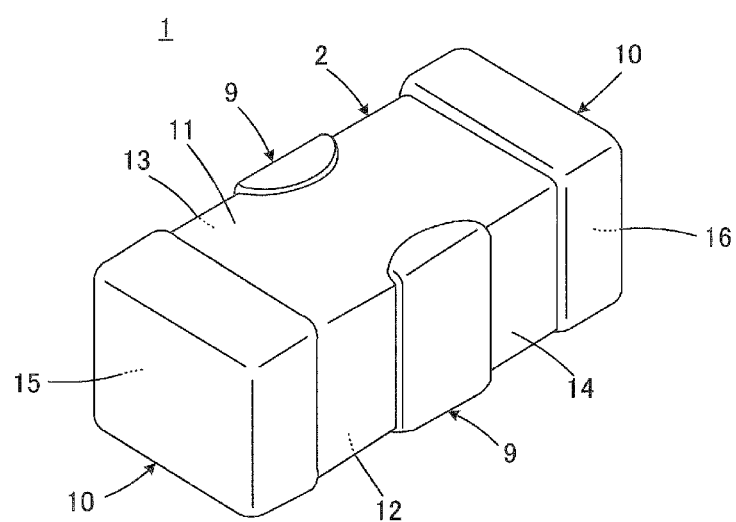
FIG. 1 is a perspective view illustrating a monolithic ceramic capacitor as a monolithic ceramic electronic component according to a first preferred embodiment of the present invention.

Preferred embodiments of the present invention will be described below in connection with a monolithic ceramic capacitor as one example of a monolithic ceramic electronic component.

First Preferred Embodiment

A first preferred embodiment of the present invention will be described below with reference to FIGS. 1 to 7. A monolithic ceramic capacitor 1 according to the first preferred embodiment is preferably a three-terminal type monolithic ceramic capacitor, for example. The monolithic ceramic capacitor 1 preferably includes a ceramic base element 2. The monolithic ceramic capacitor 1 further includes first and second inner electrodes 3 and 4, first and second inner-layer dummy conductors 5 and 6, and outer-layer dummy conductors 7, which are all disposed inside the ceramic base element 2, and first and second outer electrodes 9 and 10, which are disposed on outer surfaces of the ceramic base element 2. Details of the structure of the monolithic ceramic capacitor 1 will be described below.

The ceramic base element 2 is preferably substantially parallelepiped and includes, as outer surfaces, a pair of first and second principal surfaces 11 and 12 opposed to each other, a pair of lateral surfaces 13 and 14 opposed to each other, and a pair of end surfaces 15 and 16 opposed to each other.

Herein, a direction interconnecting the principal surfaces 11 and 12 is defined as a height direction, a direction interconnecting the lateral surfaces 13 and 14 is defined as a widthwise direction, and a direction interconnecting the end surfaces 15 and 16 is defined as a lengthwise direction. In the present preferred embodiment, a dimension of the ceramic base element 2 in the lengthwise direction is preferably greater than a dimension in the widthwise direction, and a dimension in the lengthwise direction is preferably about twice that in the widthwise direction, for example.

The ceramic base element 2 is preferably rounded at corners and ridges thereof.

Figure 2:
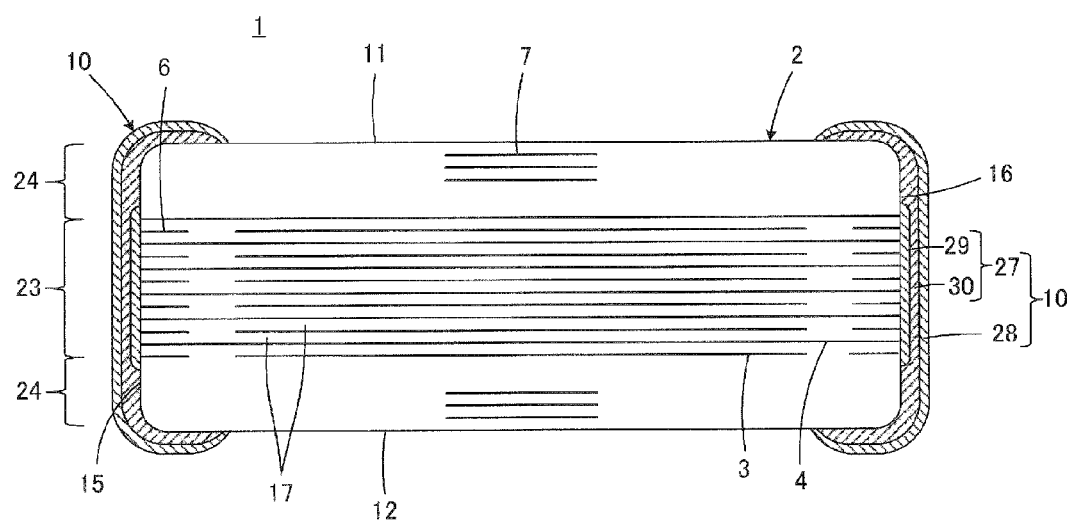
FIG. 2 is a sectional view taken along a plane parallel to lateral surfaces of a ceramic base element in the monolithic ceramic capacitor illustrated in FIG. 1.
Figure 3:
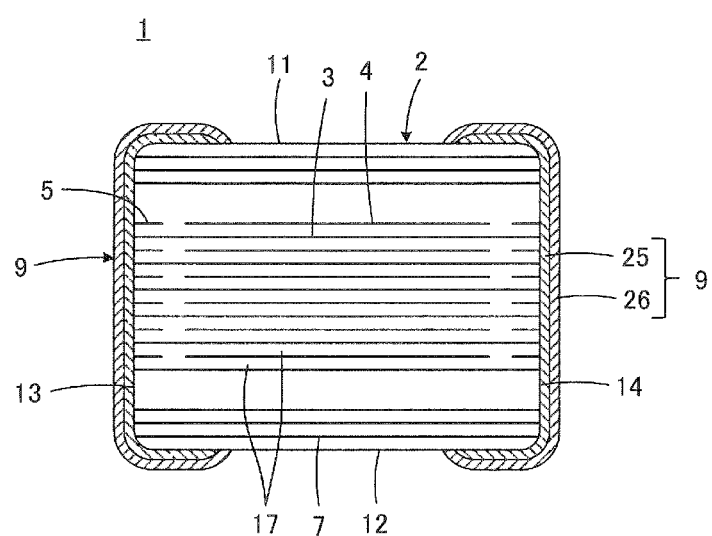
FIG. 3 is a sectional view taken along a plane parallel to end surfaces of the ceramic base element in the monolithic ceramic capacitor illustrated in FIG. 1.

As illustrated in FIGS. 2 and 3, the ceramic base element 2 has a multilayer structure including a plurality of ceramic layers 17, which extend in a direction parallel or substantially parallel to the principal surfaces 11 and 12 and which are stacked in the height direction. A thickness of each of the ceramic layers 17 is preferably about 0.5 μm to about 10 μm, and more preferably about 0.7 μm to about 3.0 μm, for example. A ceramic material used for the ceramic layer 17 can preferably be, for example, a dielectric ceramic containing $BaTiO_3$, $CaTiO_3$, $SrTiO_3$, $CaZrO_3$, or other suitable material as a main component. The dielectric ceramic may preferably further include, in addition to the main component, auxiliary components, e.g., a Mn compound, a Mg compound, a Si compound, a Co compound, a Ni compound, and a rare-earth element compound, for example.

Figure 4:
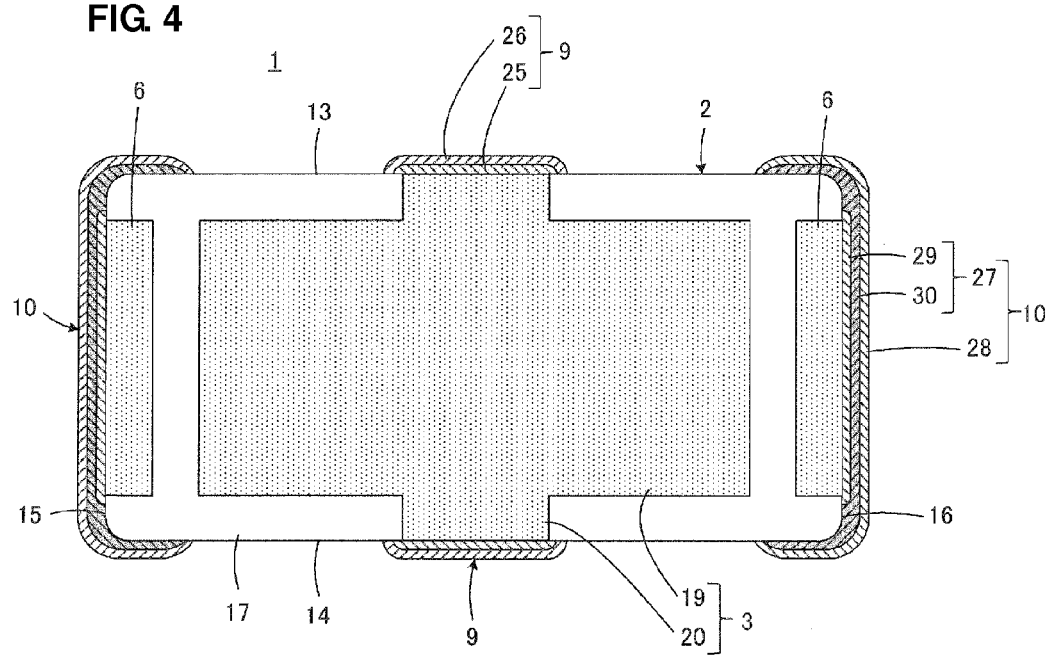
FIG. 4 is a sectional view taken along a plane parallel to principal surfaces of the ceramic base element in the monolithic ceramic capacitor illustrated in FIG. 1, the plane including a first inner electrode that extends therein.
Figure 5:
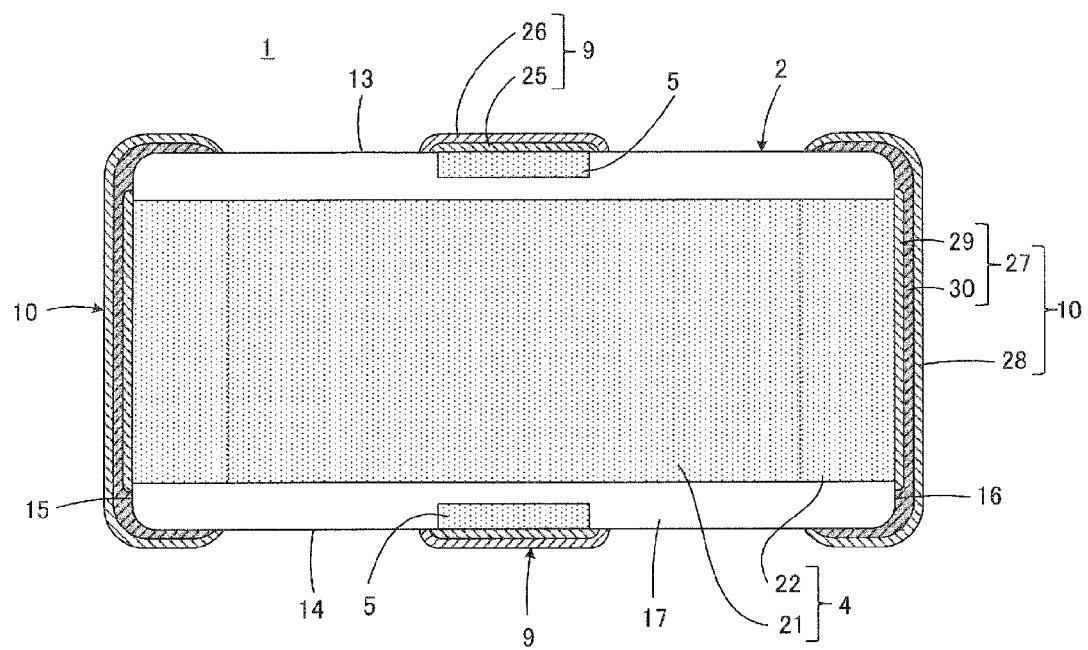
FIG. 5 is a sectional view taken along a plane parallel to the principal surfaces of the ceramic base element in the monolithic ceramic capacitor illustrated in FIG. 1, the plane including a second inner electrode that extends therein.

The inner electrode includes a plurality of first inner electrodes 3 each illustrated in FIG. 4, and a plurality of second inner electrodes 4 each illustrated in FIG. 5. The plurality of first inner electrodes 3 and the plurality of second inner electrodes 4 are alternately arranged in the height direction (stacking direction) of the ceramic base element 2, as illustrated in FIGS. 2 and 3.

As illustrated in FIG. 4, the first inner electrode 3 includes a first opposing portion 19 opposed to the second inner electrode 4 that is arranged adjacent to the relevant first inner electrode 3, and two first lead-out portions 20 each led out from the first opposing portion 19 to the outer surface of the ceramic base element 2. In the present preferred embodiment, the first inner electrode 3 preferably has a substantially crisscross shape, for example. The two first lead-out portions 20 are led out respectively to the first and second lateral surfaces 13 and 14. In other words, the first inner electrode 3 is arranged so as to extend from the first lateral surface 13 to the second lateral surface 14. Further, a dimension of the first opposing portion 19 in the lengthwise direction is preferably greater than that in the widthwise direction.

As illustrated in FIG. 5, the second inner electrode 4 includes a second opposing portion 21 opposed to the first inner electrode 3 that is arranged adjacent to a respective second inner electrode 4, and two second lead-out portions 22 each led out from the second opposing portion 21 to the outer surface of the ceramic base element 2. In FIG. 5, a boundary between the second opposing portion 21 and the second lead-out portion 22 in the second inner electrode 4 is denoted by a dotted line. In the present preferred embodiment, the second inner electrode 4 preferably has a substantially rectangular shape, for example. Further, the two second lead-out portions 22 of the second inner electrode 4 are led out respectively to the first and second end surfaces 15 and 16. In other words, the second inner electrode 4 is arranged so as to extend from the first end surface 15 to the second end surface 16.

For example, Ni, Cu, Ag, Pd, an Ag—Pd alloy, Au, or other suitable metal, can be optionally used as conductive materials for the inner electrodes 3 and 4.

A thickness of each of the inner electrodes 3 and 4 is preferably about 0.3 μm to about 2.0 μm, for example.

An electrostatic capacity is generated in a region in which the first opposing portion 19 of the first inner electrode 3 and the second opposing portion 21 of the second inner electrode 4 are opposed to each other with the ceramic layer 17 interposed therebetween. A region in which the first and second inner electrode 3 and 4 are present along the height direction, the region including the above-mentioned region generating the electrostatic capacity, is defined as an inner layer portion 23.

On the other hand, a region in which the first and second inner electrode 3 and 4 are both not present along the height direction is defined as an outer layer portion 24. There are two outer layer portions 24 on both sides of the inner layer portion 23, i.e., on one side closer to the first principal surface 11 and on another side closer to the second principal surface 12.

Preferably, the inner-layer dummy conductor is disposed in the inner layer portion 23 and includes a plurality of first inner-layer dummy conductors 5 illustrated in FIG. 5 and a plurality of second inner-layer dummy conductors 6 illustrated in FIG. 4.

In the present preferred embodiment, as illustrated in FIG. 5, the first inner-layer dummy conductor 5 is flush with the second inner electrode 4. The first inner-layer dummy conductor 5 is connected to the first outer electrode 9.

In the present preferred embodiment, as illustrated in FIG. 4, the second inner-layer dummy conductor 6 is flush with the first inner electrode 3. The second inner-layer dummy conductor 6 is connected to the second outer electrode 10.

The inner-layer dummy conductors 5 and 6 function as deposition points for plated films that define respective underlying layers of the first and second outer electrodes 9 and 10, thereby increasing current-carrying efficiency. Further, the inner-layer dummy conductors 5 and 6 contribute to increasing the strength of the ceramic base element 2.

Preferable conditions for materials and thicknesses of the inner-layer dummy conductors 5 and 6 are similar to those for the inner electrodes 3 and 4, for example. Thus, the inner-layer dummy conductors 5 and 6 are preferably made of the same or substantially the same material in the same or substantially the same thickness as in the inner electrodes 3 and 4.

It is to be noted that the inner-layer dummy conductors 5 and 6 may not be provided in some cases.

As illustrated in FIGS. 2 and 3, the outer-layer dummy conductor 7 is preferably disposed in the outer layer portion 24.

Figure 6:
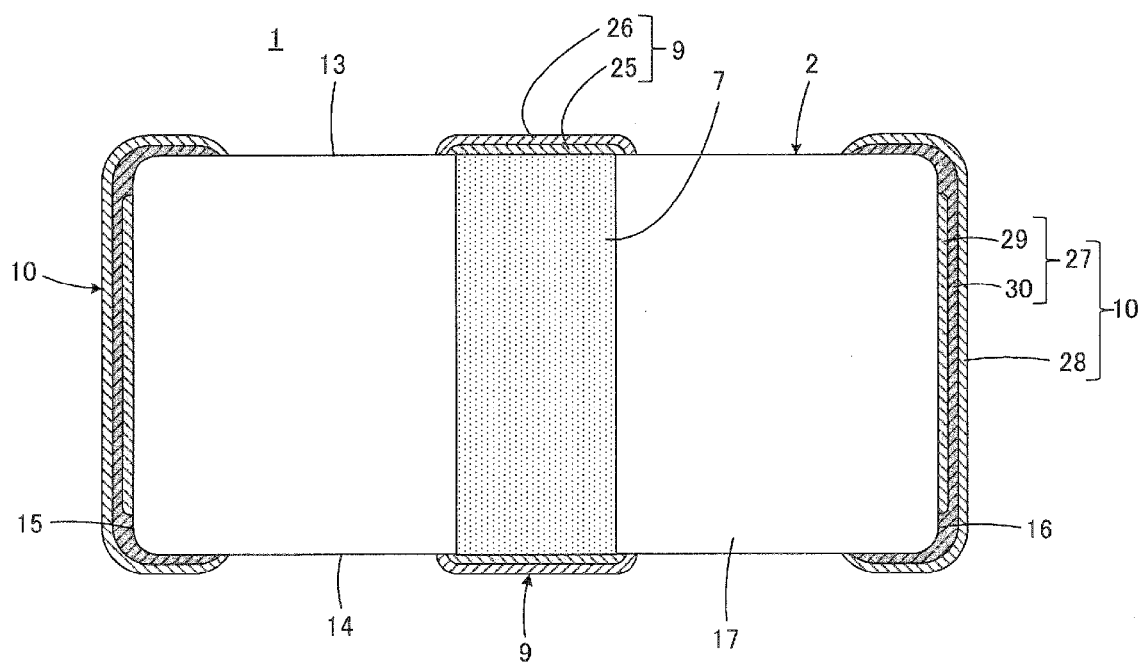
FIG. 6 is a sectional view taken along a plane parallel to the principal surfaces of the ceramic base element in the monolithic ceramic capacitor illustrated in FIG. 1, the plane including an outer-layer dummy conductor that extends therein.

The outer-layer dummy conductor 7 is preferably led out to at least two positions in the outer surfaces of the ceramic base element 2. In the present preferred embodiment, as illustrated in FIG. 6, the outer-layer dummy conductor 7 preferably has a substantially rectangular shape and is led out to two positions in the outer surfaces of the ceramic base element 2, i.e., to the first lateral surface 13 and the second lateral surface 14. In other words, the outer-layer dummy conductor 7 is preferably arranged so as to extend from the first lateral surface 13 to the second lateral surface 14.

The outer-layer dummy conductor 7 functions as a deposition point for a plated film that defines an underlying layer of the first outer electrode 9. Because of the outer-layer dummy conductor 7 is led out to two positions as described above, when media, such as steel balls, come into contact with one of the exposed portions of the outer-layer dummy conductor 7 during plating, an electric current is supplied to the other exposed portion of the outer-layer dummy conductor 7 as well. Thus, when the outer-layer dummy conductor 7 includes two or more exposed portions, a probability of contact between the exposed portions of the outer-layer dummy conductor 7 and the media is increased and the current-carrying efficiency is increased. As a result, a plating time necessary to form the plated films, which define the underlying layers of the first outer electrodes 9 described later, is reduced.

As illustrated in FIGS. 2 and 3, a plurality of the outer-layer dummy conductor 7 is successively stacked in the stacking direction of the ceramic layers 17. Preferably 10 to 100 of the outer-layer dummy conductors 7, for example, are provided in each of the outer layer portions 24.

The outer-layer dummy conductors 7 are each arranged in overlapping relation to the first lead-out portion 20 when the ceramic base element 2 is viewed in the height direction. With such an arrangement, the exposed portions of the outer-layer dummy conductors 7 define an exposed portion group in the form of a row, together with the exposed portions of the first lead-out portions 20, in the outer surface of the ceramic base element 2. In the present preferred embodiment, the exposed portion group is preferably provided in each of the first and second lateral surfaces 13 and 14.

Figure 7:
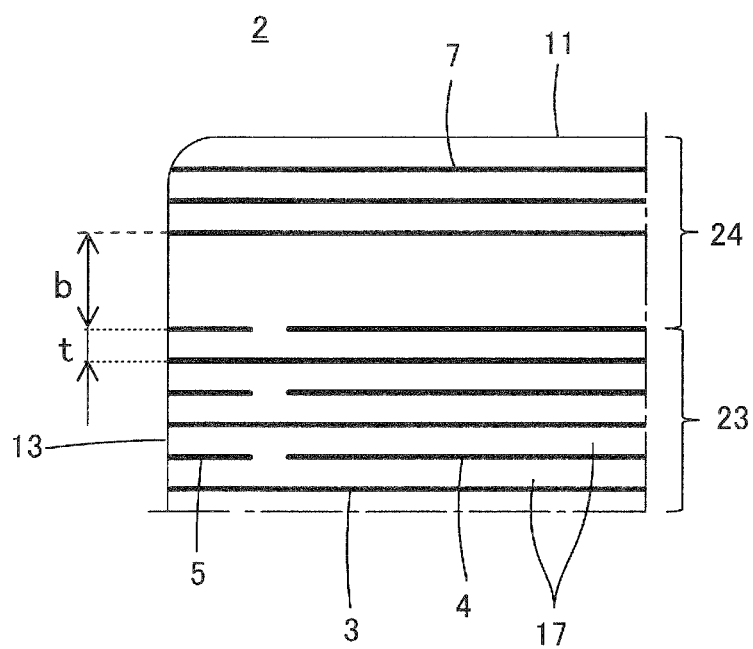
FIG. 7 is an enlarged view of a portion of the ceramic base element, illustrated in FIG. 3, to explain a feature of a preferred embodiment of the present invention.

Where, as illustrated in FIG. 7, a distance in the height direction between one of the outer-layer dummy conductors 7 in the outer layer portion 24, which is positioned closest to the inner layer portion 23, and the first or second inner electrode 3 or 4 (the second inner electrode 4 in FIG. 7) in the inner layer portion 23, which is positioned closest to the outer layer portion 24, is b and an opposing distance between the first inner electrode 3 and the second inner electrode 4 in the height direction is t, 2t≤b is satisfied.

On that condition, the outer-layer dummy conductor 7 arranged closest to the inner electrode 3 or 4 can be spaced sufficiently away from the inner electrode 3 or 4. It is therefore possible to prevent excessive pressing of the inner electrodes 3 and 4, the excessive pressing being otherwise caused due to the presence of the outer-layer dummy conductors 7. Thus, degradation of reliability, such as BDV, is prevented.

As seen from EXPERIMENTAL EXAMPLES described below, if b is less than 2t, there is a risk that the reliability may be degraded.

In particular, the above-described advantageous effect are more significant when the outer-layer dummy conductors 7 are led out in the widthwise direction in a state in which the first inner electrodes 3, each of which includes the first opposing portion 19 preferably having the dimension in the lengthwise direction greater than the size in the widthwise direction, are disposed, as in the present preferred embodiment.

The degradation of reliability is attributable to the fact that, during a pressing step before firing, the outer-layer dummy conductors 7 act to press the first lead-out portion 20, thus causing the pressed first lead-out portion 20 to extend into the first opposing portion 19 such that the distance between the inner electrodes 3 and 4 is reduced in a region in which a root portion of the first lead-out portion 20 has sunk. Such sinking of the root portion of the first lead-out portion 20 is apt to more easily occur when the first lead-out portion 20 is led out from the longer side of the first opposing portion 19.

Moreover, the sinking of the root portion of the first lead-out portion 20 is likely to occur in particular when the outer-layer dummy conductors 7 are led out to a central portion of each of the first and second lateral surfaces 13 and 14 in the lengthwise direction.

From the viewpoint of preventing the degradation of reliability, the distance b is preferably longer. However, as the distance b increases, there is a tendency to impede growth of the plated film that defines the underlying layer of the first outer electrode 9. Stated another way, there is an increased risk that a plated film growing with the outermost inner electrode 3 or 4 being a nucleus and a plated film growing with the innermost outer-layer dummy conductor 7 being a nucleus may not be connected to each other in the height direction. For that reason, b≤about 6 µm, for example, is preferably satisfied.

From a similar point of view, an interval between the outer-layer dummy conductors 7 adjacent to each other in the height direction is also preferably about 6 µm or less, for example.

The outer-layer dummy conductor 7 is preferably made of the same or substantially the same material as that of the inner electrodes 3 and 4. For example, Ni, Cu, Ag, Pd, an Ag—Pd alloy, Au, etc., mentioned above, can also be optionally used as a conductive material of the outer-layer dummy conductor 7.

A thickness of the outer-layer dummy conductor 7 is preferably about 0.3 µm to about 2.0 µm, for example.

As specifically illustrated in FIG. 3, the first outer electrode 9 is disposed on each of the first and second lateral surfaces 13 and 14 of the ceramic base element 2. In the present preferred embodiment, the first outer electrode 9 is preferably arranged to extend onto respective portions of the first and second principal surfaces 11 and 12.

The first outer electrode 9 is electrically connected to the first inner electrodes 3. As illustrated in FIGS. 3 to 6, the first outer electrode 9 includes an underlying layer 25 and an overlying layer 26, the overlying layer 26 being provided on the underlying layer 25 as required.

The underlying layer 25 of the first outer electrode 9 is preferably defined by a plated film. The plated film defining the underlying layer 25 of the first outer electrode 9 preferably directly covers not only the exposed portions of the first lead-out portions 20 of the first inner electrodes 3 and the exposed portions of the first inner-layer dummy conductors 5, but also the exposed portions of the outer-layer dummy conductors 7. For example, Cu, Ni, Ag, Pd, an Ag—Pd alloy, Au, Sn, Pb, Bi, Zn, and other suitable metals can be optionally used as a metal defining the plated film that serves as the underlying layer 25. The plated film preferably does not include any glass ingredients. Further, a metal proportion of the plated film per unit volume is preferably about 99% by volume or more, for example. A thickness of the plated film is preferably about 1 µm to about 15 µm in its thickest portion, for example. The first inner-layer dummy conductor 5 and the outer-layer dummy conductor 7 act to promote deposition and growth of the plated film that defines the underlying layer 25.

When the overlying layer 26 is formed in the first outer electrode 9, the overlying layer 26 is preferably defined as, e.g., a plated film. For example, Cu, Ni, Ag, Pd, an Ag—Pd alloy, Au, Sn, Pb, Bi, Zn, other suitable metal can be optionally used as a metal defining the plated film that defines the overlying layer 26. The plated film for the overlying layer 26 may preferably include a plurality of layers. A thickness of the plated film for the overlying layer 26 is preferably about 1 µm to about 10 µm per layer, for example.

When the overlying layer 26 is formed in the first outer electrode 9, it is preferable that the underlying layer 25 is a Ni plated film and the overlying layer 26 is a Sn plated film, for example. Alternatively, when the overlying layer 26 includes a plurality of layers, the overlying layer 26 is preferably a two-layer structure including a Ni plated layer and a Sn plated layer provided on the Ni plated layer, for example.

The second outer electrode 10 is connected to a different potential from that of the first outer electrode 9 and is disposed on each of the first and second end surfaces 15 and 16 of the ceramic base element 2. In the present preferred embodiment, the second outer electrode 10 is preferably arranged to extend onto respective portions of the first and second principal surfaces 11 and 12 and respective portions of the first and second lateral surfaces 13 and 14.

The second outer electrode 10 covers the exposed portions of the second lead-out portions 22 such that the second outer electrode 10 is electrically connected to the second inner electrodes 4. As illustrated in FIGS. 2 and 4 to 6, the second outer electrode 10 preferably includes an underlying layer 27, which is in contact with the exposed portions of the second lead-out portions 22 of the second inner electrodes 4, and an overlying layer 28, which is provided on the underlying layer 27 as required. The underlying layer 27 can preferably be defined as a plated film, a sintered metal film, and/or a conductive resin film, for example.

When the plated film is selected as a film defining the underlying layer 27, Cu, Ni, Ag, Pd, an Ag—Pd alloy, Au, Sn, Pb, Bi, Zn, or other suitable metal can be optionally used, for example, as a metal defining the plated film. The plated film preferably does not include any glass ingredients. A thickness of the underlying layer 27 is preferably about 1 µm to about 20 µm in its thickest portion, for example. The second innerlayer dummy conductor 6 promotes deposition and growth of the plated film that defines the underlying layer 27.

When the sintered metal film is selected as a film defining the underlying layer 27, Cu, Ni, Ag, Pd, an Ag—Pd alloy, Au, or other suitable metal can be optionally used, for example, as a metal defining the sintered metal film. The sintered metal film may preferably include glass ingredients. Further, the sintered metal film preferably may be fired at the same time as the ceramic base element 2 and the inner electrodes 3 and 4. As an alternative, the sintered metal film may be formed by coating a conductive paste over the ceramic base element 2 after the firing, and then baking the conductive paste.

When the conductive resin film is selected as a film defining the underlying layer 27, the conductive resin film can preferably be formed using a thermosetting resin alone or in a state mixed with a metal filler, for example.

When the sintered metal film or the conductive resin film is selected, a thickness of the underlying layer 27 is preferably about 10 µm to about 50 µm in its thickest portion, for example.

In the present preferred embodiment, the underlying layer 27 is defined by a plated film 29, which is in contact with the respective exposed portions of the second inner electrodes 4 and the second inner-layer dummy conductors 6, and a sintered metal film 30 provided on the plated film 29.

When the overlying layer 28 is to be further provided on the underlying layer 27 in the second outer electrode 10, the overlying layer 28 is preferably, for example, a plated film. For example, Cu, Ni, Ag, Pd, an Ag—Pd alloy, Au, Sn, Pb, Bi, Zn, or other suitable metal can be optionally used as a metal for the plated film that defines the overlying layer 28. The plated film for the overlying layer 28 may preferably include a plurality of layers. In that case, the overlying layer 28 is preferably a two-layer structure including a Ni plated layer and a Sn plated layer provided on the Ni plated layer, for example. A thickness of the plated film for the overlying layer 28 is preferably about 1 µm to about 10 µm per layer, for example.

The monolithic ceramic capacitor 1 is manufactured, by way of example, as follows.

A ceramic green sheet to be used as the ceramic layer 17, a conductive paste for the inner electrode, and a conductive paste for the outer electrode are prepared. The conductive paste for the inner electrode is also preferably used as a conductive paste for the inner-layer dummy conductor and a conductive paste for the outer-layer dummy conductor. The ceramic green sheet and the conductive pastes for the inner electrode and the outer electrode include a binder and a solvent. The binder and the solvent may preferably be known organic binders and solvents, respectively.

On ceramic green sheets, the conductive paste is printed in predetermined patterns by screen printing, for example, to form an inner electrode pattern, an inner-layer dummy conductor pattern, and an outer-layer dummy conductor pattern.

An outer-layer ceramic green sheet on which neither the inner electrode pattern nor the outer-layer dummy conductor pattern are printed, the ceramic green sheet on which the outer-layer dummy conductor pattern is printed, and the ceramic green sheet on which the inner electrode and the inner-layer dummy conductor pattern are printed are stacked in a predetermined order in respective predetermined numbers of sheets, whereby a mother laminate is fabricated.

Here, in the outer layer portion, the above-mentioned distance b can be adjusted by adjusting the number of the stacked outer-layer ceramic green sheets on each of which the outer-layer dummy conductor pattern is not printed. As an alternative, the distance b may be adjusted by adjusting the thickness of each of the outer-layer ceramic green sheets.

The mother laminate is pressed in the stacking direction.

The mother laminate is cut into a predetermined size, whereby a green ceramic base element is cut out.

The green ceramic base element is fired. The ceramic base element 2 illustrated in the drawings is thereby obtained. A firing temperature is preferably about 900° C. to about 1300° C., for example, depending on the materials of the ceramic sheet and the inner electrode.

Thereafter, barrel polishing is performed on the ceramic base element 2 when necessary. With the barrel polishing, corners and ridges of the ceramic base element 2 are rounded.

The ceramic base element 2 after the barrel polishing is subjected to a plating process.

With the plating process, plated films defining the underlying layers 25 of the first outer electrodes 9 are formed. At that time, as illustrated in FIG. 3, not only the first inner electrodes 3, but also the first inner-layer dummy conductors 5 and the outer-layer dummy conductors 7 are exposed to the lateral surfaces 13 and 14, and the plated films are deposited on those exposed portions that function as starting points for the deposition. Therefore, the underlying layers 25 of the first outer electrodes 9 can be efficiently formed.

The plating process is preferably performed by electrolytic plating based on a rotating barrel method, for example. Thus, a plating method is preferably performed as rotating barrel plating, for example. Conductive media, such as steel balls, are used in the plating process.

Due to the outer-layer dummy conductor 7 including two exposed portions, when the conductive media come into contact with one of the exposed portions in the plating step, an electric current is supplied to the other exposed portion as well. Therefore, the probability of contact between the exposed portions of the outer-layer dummy conductor 7 and the conductive media is increased and the current-carrying efficiency is increased. As a result, a plating time required to form the underlying layers 25 is reduced.

In the above-described plating process, the plated films 29 for the underlying layers 27 of the second outer electrodes 10 can also be simultaneously formed while the respective exposed portions of the second inner electrodes 4 and the second inner-layer dummy conductors 6 function as starting points for the deposition of the plated films.

After the plating process, heat treatment is preferably performed at temperature of about 600° C. to about 900° C., for example. The heat treatment increases the fixing strength of the plated films with respect to the ceramic base element 2.

The sintered metal film 30 in the underlying layer 27 of each second outer electrode 10 is formed by coating a conductive paste and baking the conductive paste. A baking temperature is preferably about 700° C. to 900° C., for example.

The overlying layer 26 of the first outer electrode 9 and the overlying layer 28 of the second outer electrode 10 are formed by a plating process.

The monolithic ceramic capacitor 1 is thus completed.

Second Preferred Embodiment

Figure 8:
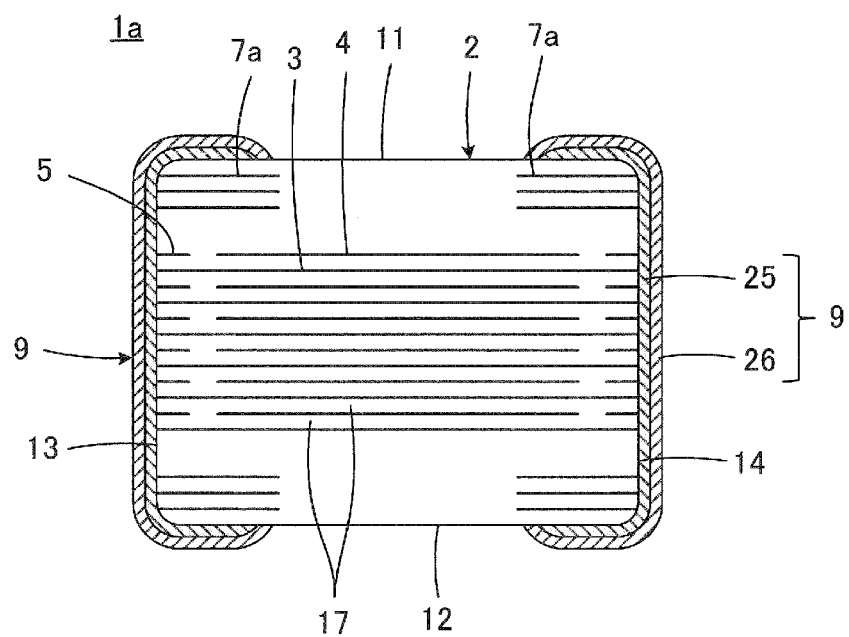
FIG. 8 is a sectional view taken along a plane parallel to end surfaces of a ceramic base element in a monolithic ceramic capacitor as a monolithic ceramic electronic component according to a second preferred embodiment of the present invention.

A second preferred embodiment of the present invention is illustrated in FIG. 8. FIG. 8 is a sectional view corresponding to FIG. 3. Equivalent elements in FIG. 8 to those in FIG. 3 are denoted by the same reference symbols and duplicate descriptions of those elements are omitted here.

In a monolithic ceramic capacitor 1a according to the second preferred embodiment, an outer-layer dummy conductor 7a is preferably arranged such that the outer-layer dummy conductor 7a does not penetrate through the ceramic base element 2 in the widthwise direction and it is separated in the widthwise direction.

Third Preferred Embodiment

Figure 9:
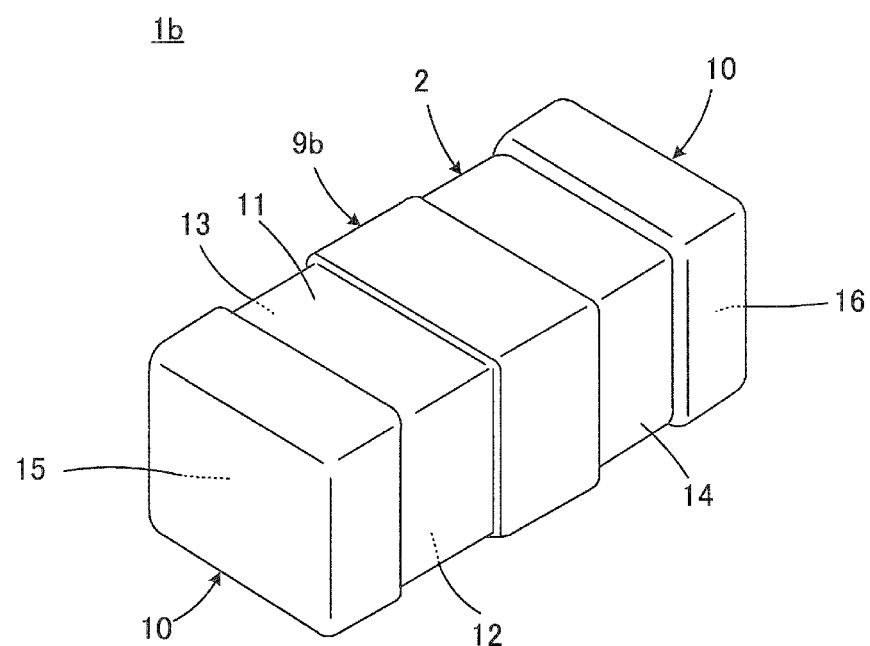
FIG. 9 is a perspective view of a monolithic ceramic capacitor as a monolithic ceramic electronic component according to a third preferred embodiment of the present invention.
Figure 10:
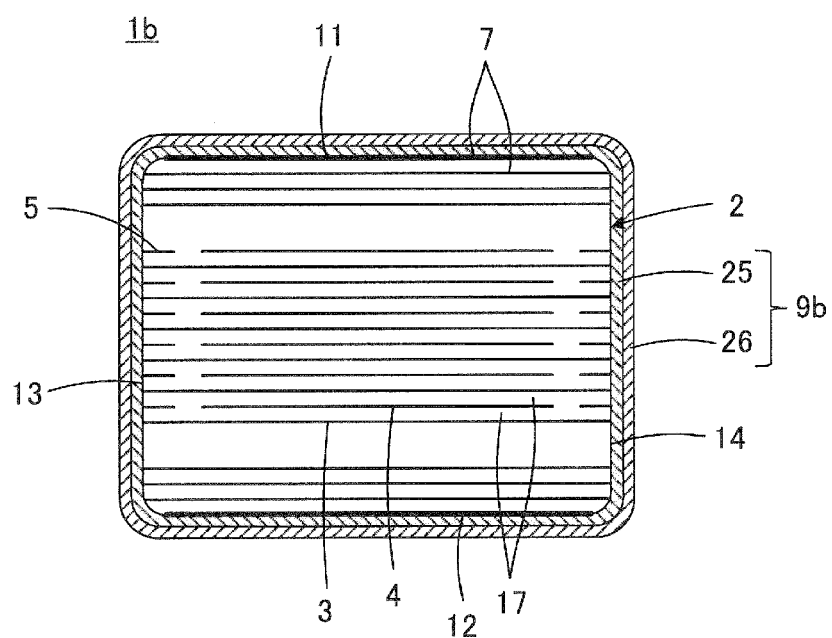
FIG. 10 is a sectional view taken along a plane parallel to end surfaces of a ceramic base element in the monolithic ceramic capacitor illustrated in FIG. 9.

A third preferred embodiment of the present invention is illustrated in FIGS. 9 and 10. FIG. 9 is a perspective view corresponding to FIG. 1, and FIG. 10 is a sectional view corresponding to FIG. 3. Equivalent elements in FIGS. 9 and 10 to those in FIGS. 1 and 3 are denoted by the same reference symbols and duplicate descriptions of those elements are omitted here.

In a monolithic ceramic capacitor 1b according to the third preferred embodiment, a first outer electrode 9b, including an underlying layer 25 and an overlying layer 26 thereof, is preferably arranged to extend onto the first and second lateral surfaces 13 and 14 and the first and second principal surfaces 11 and 12 of the ceramic base element 2 in a fully surrounding state.

In the present preferred embodiment, the outer-layer dummy conductors 7 are preferably exposed in at least respective portions of the principal surfaces 11 and 12 by chipping off the ceramic layers 17, which define the principal surfaces 11 and 12, in the above-described polishing step after the firing. This operation adds plating deposition points on the principal surfaces 11 and 12, and thus, enables the plated film for the underlying layer 25 of the first outer electrode 9b to be more easily formed in the fully surrounding state.

The outer-layer dummy conductor 7 is not always required to be exposed in its entirety at each of the principal surfaces 11 and 12, and it may preferably be exposed in a discontinuously distributed manner (e.g., in a mottled pattern). However, the exposed portions of the outer-layer dummy conductor 7 in each of the principal surfaces 11 and 12 of the outer-layer dummy conductor 7 are preferably evenly distributed over a region spanning from the first lateral surface 13 to the second lateral surface 14. Further, the exposed portions of the outer-layer dummy conductor 7 are preferably exposed without a break over the region spanning from the first lateral surface 13 to the second lateral surface 14. Thus, even when a portion in which the outer-layer dummy conductor 7 is continuously exposed from the first lateral surface 13 to the second lateral surface 14 is relatively small, a current-carrying area is preferably arranged to continuously extend over the principal surfaces 11 and 12 from the first lateral surface 13 to the second lateral surface 14. Thus, the current-carrying efficiency is maximized.

According to the third preferred embodiment, the plated film is preferably continuously arranged so as to fully extend around the ceramic base element 2 in a plating growth process that is developed in the plating step to form the underlying layer 25 of the first outer electrode 9b, whereby an electrode area functioning as the plating deposition point is increased. Therefore, the current-carrying efficiency is increased from the time at which the plated film has been continuously formed, and a thickness of the plated film formable per unit time is increased. In other words, with the present preferred embodiment, a time required to form a film for the underlying layer 25 of the first outer electrode 9b in a predetermined thickness is reduced, and the cost is reduced accordingly.

In the first preferred embodiment described above, distal end portions of the first outer electrode 9 are provided on the principal surfaces 11 and 12 of the ceramic base element 2. When stress is applied to the distal end portions of the first outer electrode 9 upon flexing of the board on which the monolithic ceramic capacitor 1 is mounted, the underlying layer 25 may be peeled off starting from those distal end portions with a relatively high probability. However, according to the third preferred embodiment, the first outer electrode 9b is preferably configured in an endless manner such that there are no distal end portions of the first outer electrode. For that reason, peeling-off of the underlying layer 25 is not likely to occur.

Further, in the first preferred embodiment described above, a plating solution used in the step of forming the overlying layer 26 by plating may intrude through the distal end portions of the underlying layer 25 of the first outer electrode 9, which portions are present on the principal surfaces 11 and 12, thus causing a possibility that reliability may be degraded. However, with the third preferred embodiment, the underlying layer 25 of the first outer electrode 9b includes no distal end portions, and thus, degradation of reliability is not likely to occur.

Moreover, since the first outer electrode 9b is preferably defined by the plated film extending completely around the ceramic base element 2, the first outer electrode 9b can be arranged to smoothly cover the outer surfaces of the ceramic base element 2. Therefore, the monolithic ceramic capacitor 1b is less likely to roll unintentionally and it can maintain a stable posture when mounted.

Fourth Preferred Embodiment

Figure 11:
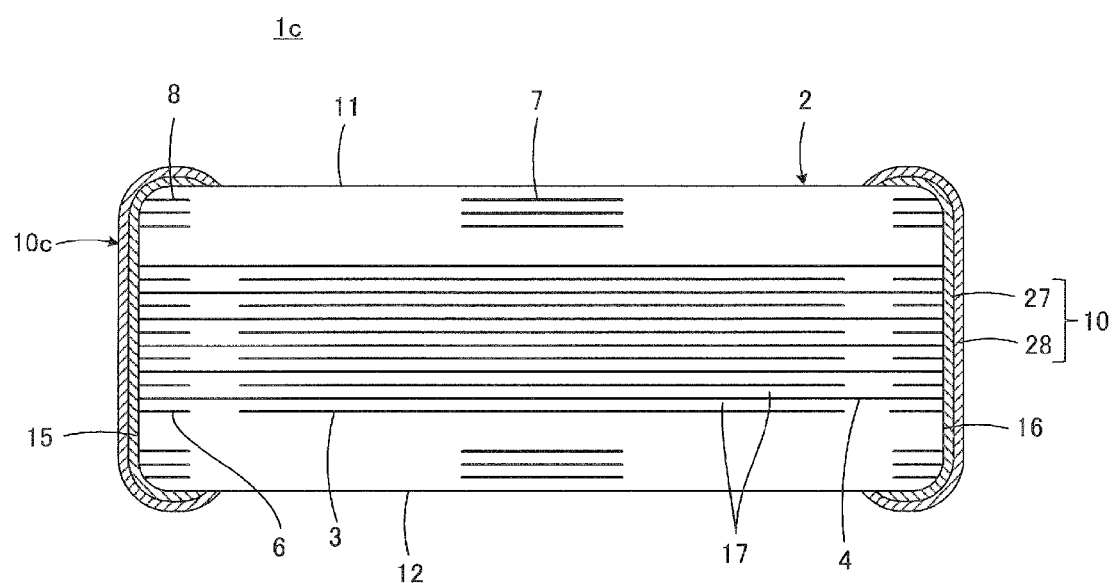
FIG. 11 is a sectional view taken along a plane parallel to lateral surfaces of a ceramic base element in a monolithic ceramic capacitor as a monolithic ceramic electronic component according to a fourth preferred embodiment of the present invention.
Figure 12:
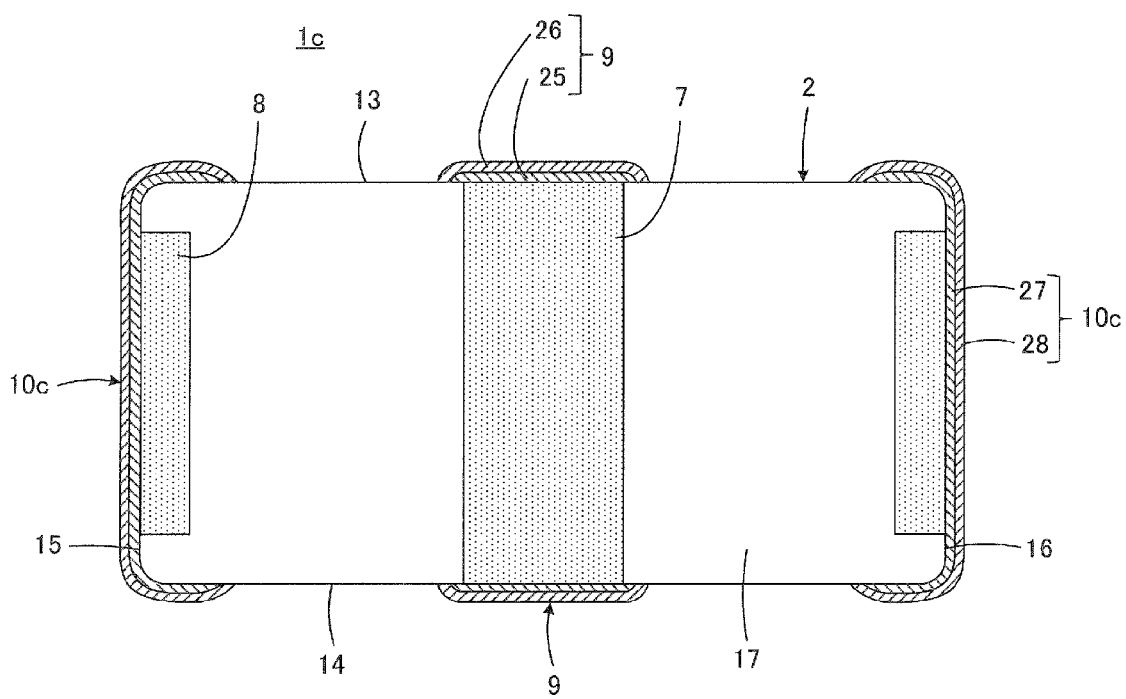
FIG. 12 is a sectional view taken along a plane parallel to principal surfaces of the ceramic base element in the monolithic ceramic capacitor illustrated in FIG. 11, the plane including outer-layer dummy conductors that extend therein.

A fourth preferred embodiment of the present invention is illustrated in FIGS. 11 and 12. FIG. 11 is a sectional view corresponding to FIG. 2, and FIG. 12 is a sectional view corresponding to FIG. 6. Equivalent elements in FIGS. 11 and 12 to those in FIGS. 2 and 6 are denoted by the same reference symbols and duplicate descriptions of those elements are omitted here.

In a monolithic ceramic capacitor 1c according to the fourth preferred embodiment, a second outer-layer dummy electrode 8 is preferably flush with the outer-layer dummy conductor 7.

Further, an underlying layer 27 of a second outer electrode 10c is preferably entirely defined by a plated film. Therefore, the underlying layers 25 and 27 of the first and second outer electrodes 9 and 10c can be formed at the same time.

The second outer-layer dummy conductor 8 functions as a deposition point for the plated film that defines the underlying layer 27 of the second outer electrode 10c, thereby increasing the current-carrying efficiency.

The dummy conductor, particularly the outer-layer dummy conductor, may contribute to the development of electrical characteristics. Further, the dummy conductor may preferably have any desired shape. For example, the outer-layer dummy conductor may have the same or substantially the same shape as the inner electrode.

In accordance with the third preferred embodiment, non-limiting samples of the monolithic ceramic capacitor were fabricated as follows.

(1) Size in the lengthwise direction×size in the widthwise direction of the ceramic base element: about 1.6 mm×about 0.8 mm (however, the size in the heightwise direction differs depending on the samples)

(2) First outer electrode

Underlying layer: Cu plated film having a thickness of about 10 μm

Overlying layer: Ni plated film having a thickness of about 3 μm and Sn plated film having a thickness of about 3 μm, the latter being coated on the former (3) Second outer electrode Underlying layer: Cu plated film having a thickness of about 10 μm and Cu sintered metal film having a thickness of about 15 μm, the latter being coated on the former Overlying layer: Ni plated film having a thickness of about 3 μm and Sn plated film having a thickness of about 3 μm, the latter being coated on the former (4) Inner electrode Distance t between the inner electrodes: as per listed in Table 1

Thickness of the inner electrode: about 0.56 μm

Number of the inner electrodes: 345

(5) Inner-layer dummy conductor

Parameter values are the same as those for the inner electrode (6) Outer-layer dummy conductor Distance between the outer-layer dummy conductors: equal to the distance t between the inner electrodes Thickness of the outer-layer dummy conductor: about 0.56 μm Number of the outer-layer dummy conductors: 56 in each of the upper and lower outer layer portions (7) Distance b between the outermost inner electrode and the innermost outer-layer dummy conductor: as per listed in Table 1

As indicated in Table 1, BDV and a plating failure were evaluated for each of the samples with t and b each set to different values from one another.

The measurement of t and b was performed by preparing three capacitors per sample type, and grinding the ceramic base element of each capacitor to about ½ in the widthwise direction such that a cross-section defined by a certain size in the lengthwise direction and a certain size in the thickness direction was exposed to the ground surface.

Further, the distance t was obtained by measuring, in the above-mentioned cross-section, respective distances between adjacent electrodes of fifteen inner electrodes, which were positioned in an uppermost region of the inner layer portion, with an electron microscope, and by calculating an average value of the distances measured for the three samples.

The distance b was obtained by measuring, in the above-mentioned cross-section, a distance between the outer layer portion on the side closer to the first principal surface and the inner layer portion, both the outer and inner layer portions being positioned at about ½ of the size in the lengthwise direction, with the same electron microscope, and by calculating an average value of the distances measured for the three samples.

BDV was measured by preparing 10 capacitors per sample type, and performing a measurement under condition of voltage boosting rate of about 100 V/sec with a DC voltage breakdown testing device.

The plating failure was evaluated by preparing 1000 capacitors per sample type, the capacitors being in a stage in which the Cu plated film defining the underlying layer of the first outer electrode was provided, confirming a state of the Cu plated film between the outer layer portion and the inner layer portion with an optical microscope, determining the capacitor, in which the plated film was disconnected, to be defective for the reason of a plating failure, and counting the number of samples, which exhibited the plating failure, among the 1000 capacitors.

The Cu plated film defining the underlying layer of the first outer electrode was formed as follows. First, strike Cu plating was performed under the conditions of a current density of about 0.1 A/dm$^2$ for about 60 minutes with the rotating barrel plating by using a plating bath with pH of about 8.5 and a bath temperature of about 25° C., the plating bath containing about 14 g/L of copper pyrophosphate, about 120 g/L of potassium pyrophosphate, and about 10 g/L of potassium oxalate. Then, thick Cu plating was performed under the conditions of a current density of about 0.3 A/dm$^2$ for about 60 minutes with the rotating barrel plating by using a Pyrobright processing bath, available from Uyemura & Co., Ltd., with pH of about 8.8 and a bath temperature of about 55° C. As a result, the Cu plated film was formed.

TABLE 1

| Sample No. | t(μm) | b(μm) | BDV(V) | Plating Failure |
|---|---|---|---|---|
| Sample 1 | 1.24 | 1.24 | 96.1 | 0/1000 |
| Sample 2 | 1.22 | 2.44 | 101.7 | 0/1000 |
| Sample 3 | 1.23 | 3.69 | 103.0 | 0/1000 |
| Sample 4 | 1.21 | 4.85 | 103.9 | 0/1000 |
| Sample 5 | 1.20 | 6.00 | 103.8 | 0/1000 |
| Sample 6 | 1.24 | 7.42 | 104.1 | 1/1000 |
| Sample 7 | 1.22 | 8.52 | 104.3 | 3/1000 |

As seen from Table 1, BDV of about 100 V or higher was achieved with Samples 2 to 7 each satisfying $2t \leq b$.

In particular, good adhesion of the plated film was further obtained with Samples 3 to 5 each satisfying $b \leq$ about 6 μm.

Though not listed in Table 1, it is also confirmed that, as a result of conducting similar experiments in which, among the above-described conditions for EXPERIMENTAL EXAMPLES, the distance t between the inner electrodes was changed to about 3.0 μm or about 0.7 μm, similar advantageous effects to those in the above-described experimental results can be obtained.

Preferred embodiments of the present invention are not limited to the above-described monolithic ceramic capacitor, and the present invention can also preferably be applied to other types of monolithic ceramic electronic component. For example, when the ceramic base element is made of a piezoelectric ceramic, a monolithic ceramic electronic component functioning as a piezoelectric component can preferably be provided. When the ceramic base element is made of a semiconductor ceramic, e.g., a spinel ceramic, a monolithic ceramic electronic component functioning as a thermistor can preferably be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monolithic ceramic electronic component comprising:
a ceramic base element including a plurality of stacked ceramic layers, and, as outer surfaces, first and second principal surfaces opposed to each other, first and second lateral surfaces opposed to each other, and first and second end surfaces opposed to each other;

first inner electrodes disposed inside the ceramic base element and each including a first opposing portion and a first lead-out portion led out from the first opposing portion to the outer surface of the ceramic base element;

second inner electrodes disposed inside the ceramic base element and each including a second opposing portion, which is opposed to the first opposing portion with at least one of the plurality of ceramic layers interposed therebetween, and a second lead-out portion led out from the second opposing portion to the outer surface of the ceramic base element;

a first outer electrode disposed on at least one of the outer surfaces of the ceramic base element and including a plated film that directly covers an exposed portion of the first lead-out portion; and a second outer electrode disposed on at least one of the outer surfaces of the ceramic base element, electrically connected to the exposed portion of the second lead-out portion, and connected to a different potential from that of the first outer electrode; wherein a direction interconnecting the first and second principal surfaces is defined as a height direction; a region in which the first inner electrodes and the second inner electrodes are present in the height direction is defined as an inner layer portion; and a region in which the first inner electrodes and the second inner electrodes are both not present in the height direction is defined as an outer layer portion;

outer-layer dummy conductors are disposed in the outer layer portion such that the outer-layer dummy conductors are each led out to one of the outer surfaces of the ceramic base element in overlapping relation to the first lead-out portion when the ceramic base element is viewed in the height direction, the outer-layer dummy conductors having exposed portions directly covered with the plated film of the first outer electrode; and where a distance in the height direction between one of the outer-layer dummy conductors in the outer layer portion, which is arranged closest to the inner layer portion, and one of the first inner electrodes or the second inner electrodes in the inner layer portion, which is arranged closest to the outer layer portion, is b, and an opposing distance between an adjacent pair of the first inner electrodes and the second inner electrodes in the height direction is t, $2t \leq b$ is satisfied.

2. The monolithic ceramic electronic component according to claim 1, wherein $b \leq$ about 6 μm is satisfied.

3. The monolithic ceramic electronic component according to claim 1, wherein, assuming a direction interconnecting the first and second lateral surfaces is defined as a widthwise direction, and a direction interconnecting the first and second end surfaces is defined as a lengthwise direction, a dimension of each of the first and second lateral surfaces along the lengthwise direction is greater than a dimension of each of the first and second end surfaces along the widthwise direction, the first opposing portion has a substantially rectangular shape having a longer side and a shorter side, and the first lead-out portion is led out from the longer side of the first opposing portion to at least one of the first and second lateral surfaces.

4. The monolithic ceramic electronic component according to claim 3, wherein the first lead-out portion is led out to extend across a central portion of at least one of the first and second lateral surfaces in the lengthwise direction.

* * * * *